United States Patent
Rathi et al.

(10) Patent No.: US 7,016,309 B1
(45) Date of Patent: Mar. 21, 2006

(54) METHOD AND APPARATUS FOR CALCULATING PACKET LOSS FOR A COMMUNICATION CIRCUIT

(75) Inventors: Bharat D. Rathi, Monte Sereno, CA (US); Kui Zhang, Cupertino, CA (US); Satyanarayana R. Raparla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/547,959

(22) Filed: Apr. 12, 2000

(51) Int. Cl.
*H04L 12/26* (2006.01)
(52) U.S. Cl. ........................ 370/252; 370/231
(58) Field of Classification Search .......... 370/230, 370/231, 238, 252, 395.21, 401, 254
See application file for complete search history.

(56) References Cited

U.S. PATENT DOCUMENTS

| | | | |
|---|---|---|---|
| 5,793,976 A * | 8/1998 | Chen et al. ............ 395/200.54 |
| 5,878,032 A * | 3/1999 | Mirek et al. ................ 370/252 |
| 5,933,416 A * | 8/1999 | Schenkel et al. ........... 370/254 |
| 5,987,018 A * | 11/1999 | Freeburg et al. ......... 370/310.2 |
| 6,038,606 A * | 3/2000 | Brooks et al. .............. 709/235 |
| 6,058,102 A * | 5/2000 | Drysdale et al. ............ 370/252 |
| 6,097,699 A * | 8/2000 | Chen et al. ................. 370/231 |
| 6,188,674 B1 * | 2/2001 | Chen et al. ................. 370/252 |
| 6,363,053 B1 * | 3/2002 | Schuster et al. ............ 370/230 |
| 6,366,563 B1 * | 4/2002 | Weldon et al. ............. 370/252 |
| 6,693,921 B1 * | 2/2004 | Whitfield ................... 370/516 |

* cited by examiner

Primary Examiner—Man U. Phan
Assistant Examiner—Toan Nguyen
(74) Attorney, Agent, or Firm—Sierra Patent Group, Ltd.

(57) ABSTRACT

A method and apparatus for accurately calculating packet loss along a communication channel using data in a pair of measuring packets is disclosed. The invention calculates packet loss between a first and second node over a communication circuit. A first known quantity of packets is communicated from the first node to the second node at a first known time. A first actual count of packets received by the second node from the first known quantity of packets is then determined. A second known quantity of packets is then communicated from the first node to the second node at a second known time. A second actual count of packets received by the second node from the second known quantity of packets is then determined. The difference between the first known quantity of packets communicated at the first known time and the second known quantity of packets communicated at the second known time is calculated to obtain a value for "packets sent". The difference between the first actual count of packets received and the second actual count of packets received is calculated to obtain a value for "packets received". The difference between the packets sent and the packets received provides a value for "packet loss" between the first known time and second known time.

8 Claims, 5 Drawing Sheets

METHOD AND APPARATUS FOR CALCULATING PACKET LOSS FOR A COMMUNICATION CIRCUIT

BACKGROUND OF THE INVENTION

1. Field of the Invention

This invention pertains generally to packet loss calculation schemes. In particularl, the invention is a method and apparatus for accurately calculating packet loss along a communication channel using data in a pair of measuring packets.

2. The Prior Art

Communication circuits and permanent virtual circuits (PVC's) are known for establishing a connection between two networks and nodes between the two networks. Common PVC's utilizing the Internet's infrastructure include frame-relay, ATM (asynchronous transfer mode), and IP VPN (Internet protocol virtual private network), among others.

A prior art system will normally include a source node S and a destination node D. Node S residing in a first network A is coupled to node D residing in a remote network B by a PVC. The PVC carries out the operation of communicating data packets between node S and node D. Each node, S and D, may comprise any data processing means, but more commonly comprises a router device as is known in the art. Often there is need for measuring the packet loss arising from traffic between node S and node D. For example, network service providers (providing the PVC channel) and their customers (users of node S and node D) use packet loss as part of their service level agreements. Thus, there is a need for accurately calculating packet loss through channels such as PVC.

Prior art implementations for calculating packet loss through a PVC generally comprise an application residing somewhere in one of the networks (A or B). In operation, this application queries node S for the number of packets transmitted to node D by node S (packets sent). The application also queries node D (preferably at the same time as the query to S2) for the number of packets received from node S by node D (packets received). Each of the nodes D and S maintain a conventional counter for packets sent and received by the respective node. In response to the application's query, the nodes D and S provide the requested value. The application then determines the packet loss from the values provided by nodes S and D, wherein:

packet loss=packets sent−packets received.

There are, however, disadvantages with the prior art implementation described above. First, there is often latency in communications between node S and the application and/or between node D and the application as is known in the art. Accordingly, it may be difficult for the application to query the nodes S and D at the same time. If the nodes S and D are not queried at the same time, the packets sent and packets received values provided by the corresponding nodes may be inaccurate, and thus the resulting packet loss calculation is also inaccurate. Second, even if the nodes S and D are queried at the same time, there may be packets in transit between nodes S and D. These packets, which may arrive at node D, are not included in the count for packets received by node D since at the time the simultaneous query is made, the packets are still in transit and have not arrived a node D. Thus, the packets sent and packets received values provided by the nodes S and D may be inaccurate, resulting in an inaccurate packet loss calculation.

Accordingly, there is a need for a method and apparatus for accurately calculating packets loss communicated over a communication circuit. The present invention satisfies these needs, as well as others, and generally overcomes the deficiencies found in the background art.

BRIEF DESCRIPTION OF THE INVENTION

The present invention is a method and apparatus for calculating packet loss for a communication circuit. In general, the invention calculates packet loss between a first and second node communicating over a communication circuit. By way of example, such communication circuit may be a frame-relay PVC, ATM PVC, or other forms of IP tunnels (e.g., GRE (Generic Router Encapsulation) tunnel, IPsec tunnel).

The invention relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

In general the invention operates upon values or information provided in a pair of measuring packets, each communicated between a first source node and second destination node. The source and destination nodes are commonly configured as router devices and are coupled to each other via a conventional communication channel, such as a virtual circuit.

According to a first embodiment, the method of the present invention comprises communicating a first known quantity of packets from the first node to the second node at a first known time; determining a first actual count of packets received by the second node from the first known quantity of packets; communicating a second known quantity of packets from the first node to the second node at a second known time; determining a second actual count of packets received by the second node from the second known quantity of packets; determining the difference between the first known quantity of packets communicated at the first known time and the second known quantity of packets communicated at the second known time to obtain a value for "packets sent"; determining the difference between the first actual count of packets received and the second actual count of packets received to obtain a value for "packets received"; and determining the difference between the packets sent and the packets received to obtain a value for "packet loss" between the first known time and second known time.

An object of the invention is to provide a method and apparatus for calculating packet loss through a communication channel which overcomes the deficiencies of the prior art.

Another object of the invention is to provide a method and apparatus for calculating packet loss through a communication channel which does not require counter synchronization of both ends of the channel.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 3:
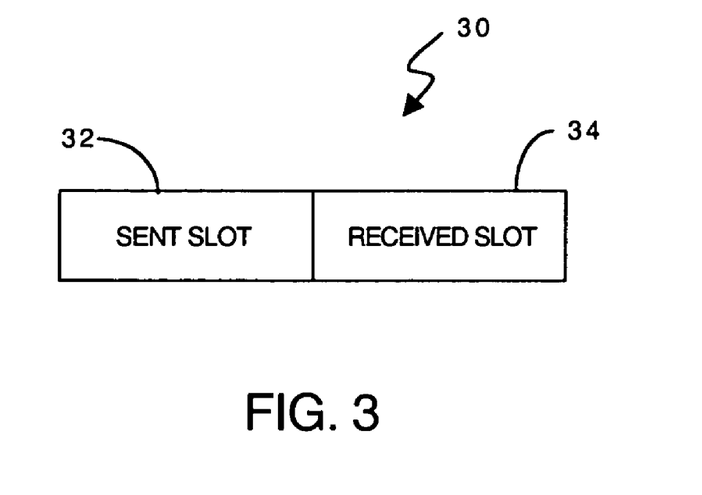
FIG. 3 is a block diagram depicting a measuring packet data structure according to the present invention.
Figure 4:
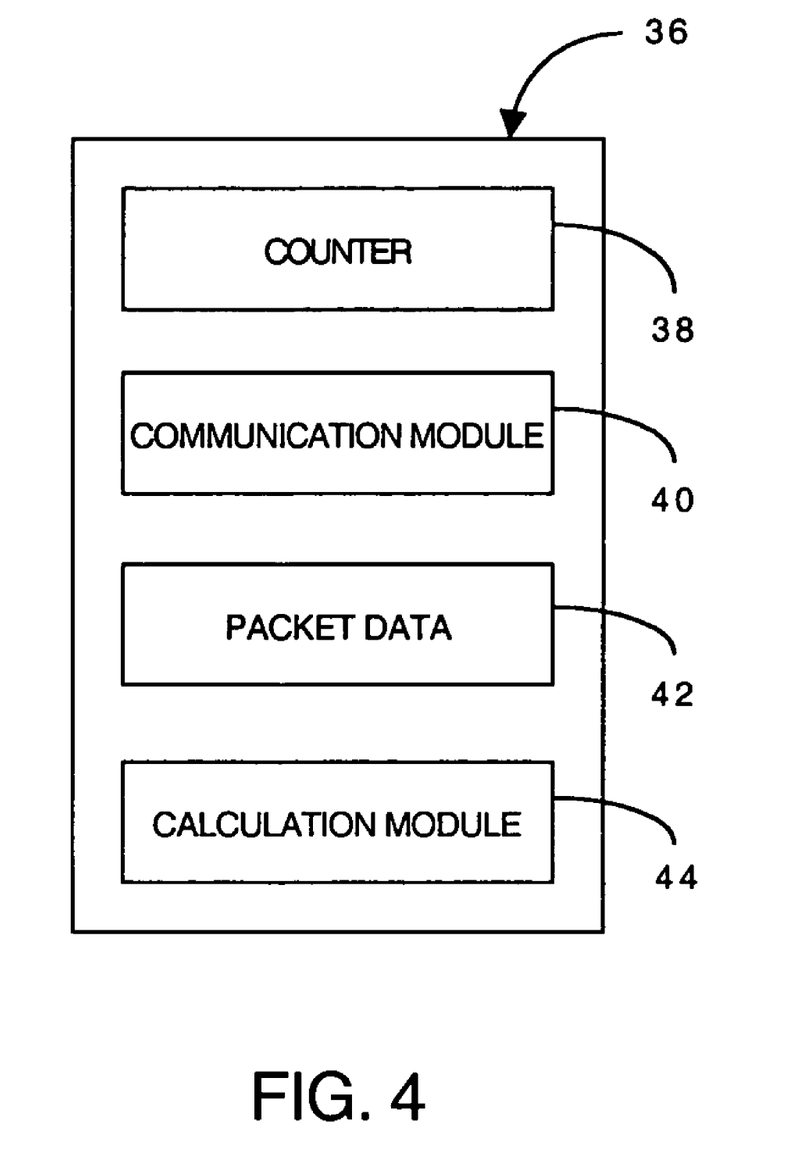
FIG. 4 is a block diagram depicting an exemplary embodiment of the present invention.
Figure 5:
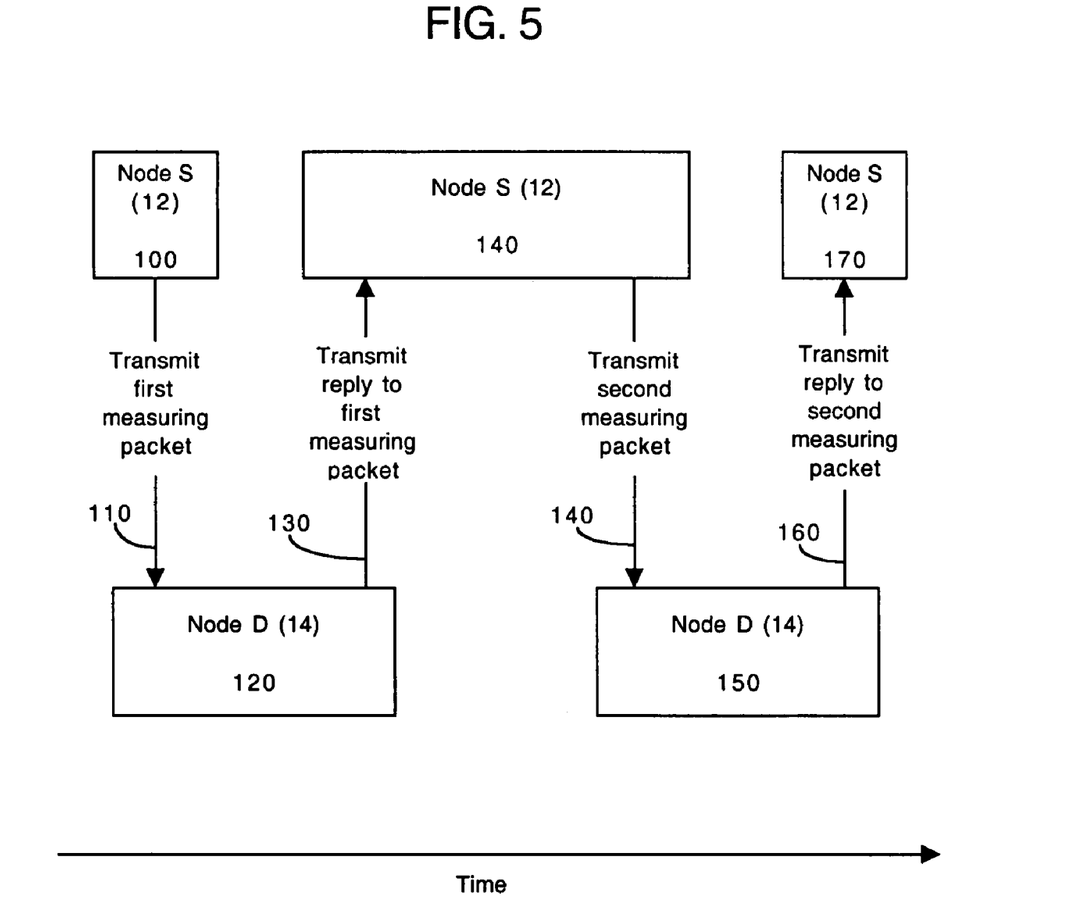
FIG. 5 is a flow diagram depicting the communication sequences between nodes connected by a communication circuit according to the present invention.
Figure 6:
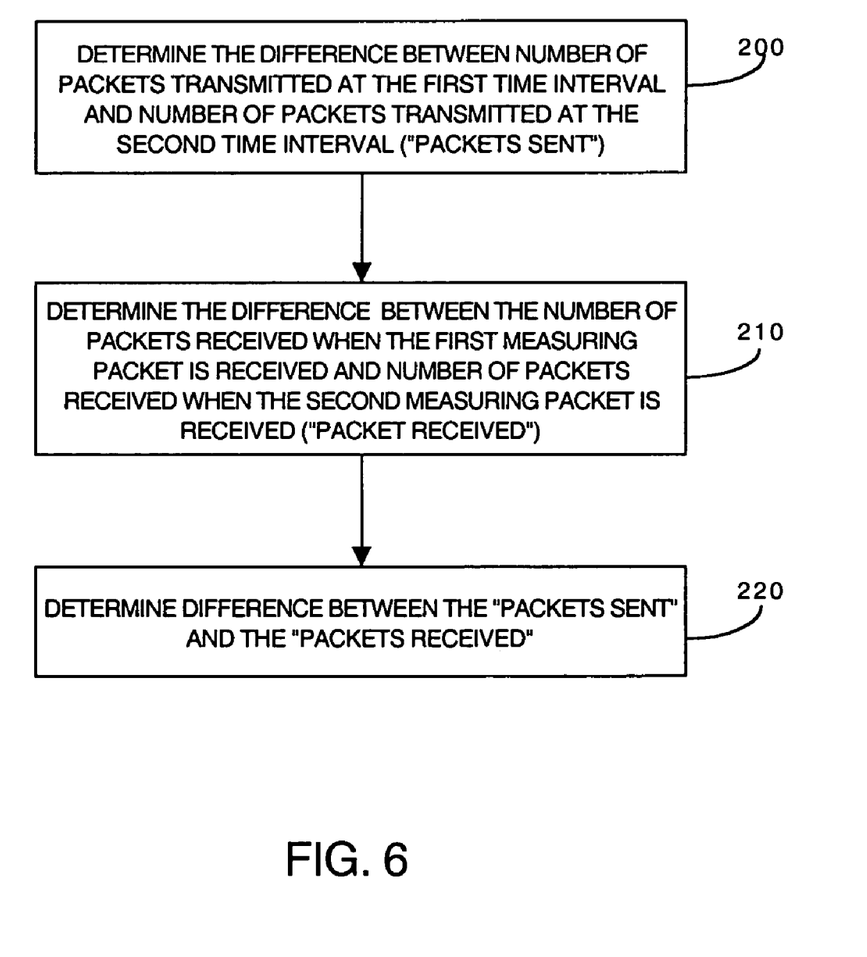
FIG. 6 is a flow chart depicting the acts associated with calculating packet loss according to the present invention.

Referring more specifically to the drawings, for illustrative purposes the present invention is embodied in the apparatus shown FIG. 1 through FIG. 4 and the method outlined in FIG. 5 and FIG. 6. It will be appreciated that the apparatus may vary as to configuration and as to details of the parts, and that the method may vary as to details and the order of the steps, without departing from the basic concepts as disclosed herein. The invention is disclosed generally in terms of a method for calculating packet loss through a communication circuit, although numerous other uses for the invention will suggest themselves to persons of ordinary skill in the art.

Figure 1:
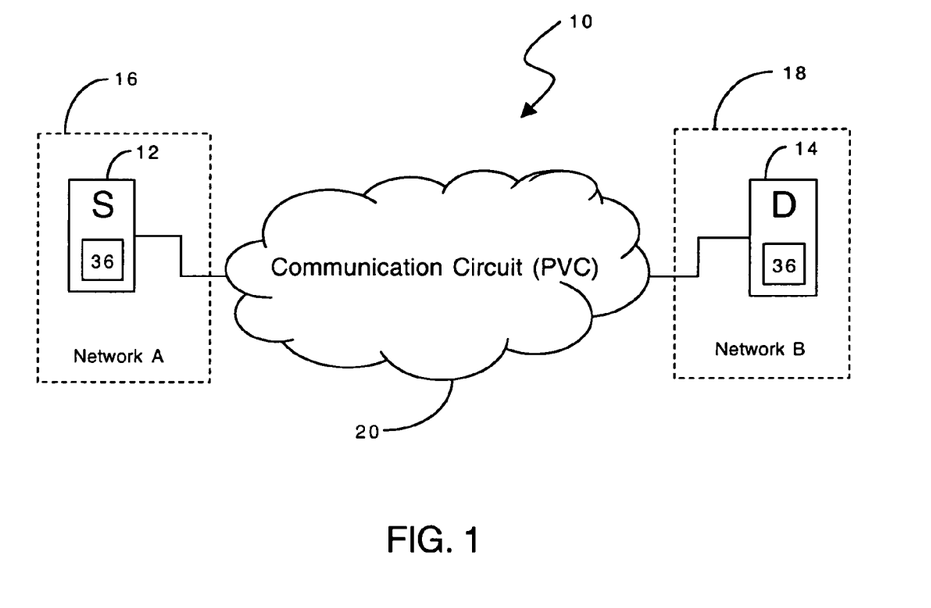
FIG. 1 is a block diagram depicting a system according to the present invention.

Referring first to FIG. 1, there is shown a block diagram of an exemplary system 10 in accordance with the present invention. System 10 includes a first node S (designated 12) and a second node D (designated 14). Node S 12 residing in network A (designated 16) is operatively coupled for communication to node D 14 residing in network B (designated 18) via a conventional communication circuit 20. Networks A 16 and B 18 may be any conventional networks including, for example, a LAN (local area network) or a dial-up network.

Figure 2:
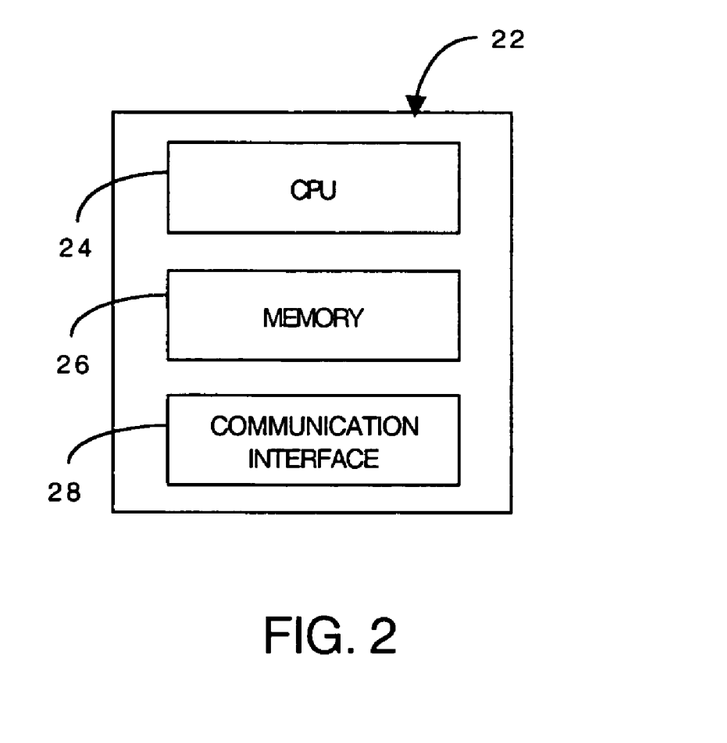
FIG. 2 is a block diagram of an exemplary data processing means suitable for use with the present invention.

Nodes S 12 and D 14 comprise conventional data processing means. More particularly, nodes S 12 and D 14 are commonly configured as router devices as is known in the art. FIG. 2 shows a functional block diagram of a data processing means (computer) 22. Nodes S 12 and D 14 will normally be structured and configured as computer 22 as described herein, although other configurations as is known in the art may also be used with the invention. Computer 22 includes conventional hardware components, such as a CPU (central processing unit) 24, a memory 26, a communication interface 28, and other conventional components (not shown). The CPU 24 executes the instructions of the present invention, which is generally embodied in software and which may be stored or resident in the memory 26. The communication interface 28 is used for transmitting and receiving data with other devices (such as other nodes) as is known in the art.

The communication circuit (PVC) 20 may be any conventional communication channel including, for example, a frame-relay PVC, an ATM PVC or other forms of IP tunnels. The present invention provides an enhanced method for calculating the packet loss for communications between nodes S 12 and D 14 through PVC 20. It is noted that system 10 is only exemplary and that it will be readily apparent to those skilled in the art having this disclosure that the invention may be used to calculate packet loss in other topology architectures.

The nodes D 14 and S 12 further include a calculating algorithm 36 for calculating the packet loss for communication through PVC 20. The calculating algorithm 36 is described in further detail below in conjunction with FIG. 4 through FIG. 6. The method and apparatus for calculating packet loss are generally described herein for communications from node S 12 to node D 14 through PVC 20. An analogous sequence of acts is carried out for calculating the packet loss for communications from node D 14 to S 12.

Referring now to FIG. 3, as well as FIG. 1 and FIG. 2, there is shown a block diagram depicting a measuring packet data structure 30 in accordance with the present invention. The nodes S 12 and D 14 communicate measuring packet 30 in addition to other data and control packets via PVC 20 during operation "inband". By communicating the measuring packets 30 "inband", counter synchronization is not required on nodes S 12 and D 14.

Measuring packet 30 includes a "sent slot" 32 and a "received slot" 34. The sent slot 32 is used for communicating a known quantity of packets communicated from the source node S 12 to the destination node D 14. The "sent slot" 32 may include actual packet data information (such as "100" packets, for example) or a reference (pointer, offset or index) to data maintained locally as is known in the art. In general, node S 12 will indicate in slot 32 the number of packets transmitted at a known time or at a specific time interval.

Node D 14 receives the transmitted measuring packet 30 from node S 12 and provide the actual count of received packets (e.g., "90" packets) into the "received" slot 34 and communicates the measuring packet 30 back (reply) to node D 14. The actual count provided by node D 14 is generally the number of packets received by node D 14 at the time the measuring packet 30 is received. In operation, node S 12 will communicate a plurality of measuring packets 30 to node D 14 to determine the packet loss through PVC 20 as described in further detail below in conjunction with FIG. 5 and FIG. 6.

Referring next to FIG. 4, there is shown a functional block diagram depicting an exemplary embodiment of the calculating algorithm 36 in accordance with the present invention. As noted above, the invention is normally embodied in a software algorithm executed by the nodes S 12 and D 14.

Calculating algorithm 36 comprises counter 38, communication module 40, packet data 42, and calculation module 44. The counter 38 comprises a conventional data packet counter which tracks the number of packets transmitted and received by a node. In node S 12, the counter 38 tracks the number of packets sent to node D 14 via PVC 20. In node D 14, the counter 38 tracks the number of packets received from node S 12 via PVC 20. As noted above, the acts for calculating packet loss from node D 14 to node S 12 is analogous. In that case, the counter 38 of node D 14 would also track the number of packets sent to node S 12 via PVC 20, and the counter 38 of node S 12 would also track the number of packets received from node D 14 via PVC 20.

The communication module 40 communicates the measuring packet 30 with other nodes. For example, in system 10, node S 12 communicates the measuring packet 30 to node D 14 with data in slot 32, and node D 14 replies to the measuring packet 30 with data in slot 34. As noted above, the source node (S 12, in this case) communicates a known packet quantity in the sent slot 32 of the packet 30 to the destination node (D 14, in this case). The communication module 40 generally communicates measuring packet 30 at a predetermined interval, such as every 60 seconds, for example. The measuring packets are communicated in-line with the other data and control packets communicated as is known in the art.

When node D 14 receives the measuring packet, node D 14 replies with the actual count of packets received in received slot 34 and communicates the measuring packet back to node S 12. When the node S 12 receives the reply from D 14, node S 12 maintains the known packet quantity (from slot 32) and actual received count (from slot 34) in a memory space, generally designated as Packet Data 42 in FIG. 4. The structure of Packet Data 42 comprises a conventional storage means, such as a table for example.

The calculation module 44 uses the data from the measuring packet (and maintained in packet data 42) to calculate the packet loss between the nodes S 12 and D 14 via PVC 20. In the preferred embodiment, the calculation module 44 calculates packet loss based on data in a pair of measuring packets (i.e., data provided in a first and second measuring packet). The details of carrying out the calculation are described more fully below in conjunction with FIG. 6.

The method and operation of invention will be more fully understood with reference to the flow charts of FIG. 5 and FIG. 6, as well as FIG. 1 through FIG. 4. The order of actions as shown in FIG. 5 and FIG. 6 and described below is only exemplary, and should not be considered limiting.

Referring now to FIG. 5, as well as FIG. 1 through FIG. 4, there is shown a flow diagram depicting the communication sequences carried out between nodes connected by a communication circuit according to the present invention. FIG. 5 depicts the communication and reply of a pair of measuring packets, although, in operation, a plurality of measuring packets will be communication between Nodes S 12 and D 14 in order to measure the packet loss over time.

At box 100, node S 12 determines the number of packets that have been sent to node D 14 from the counter 38. This value is the first known quantity of packets and is normally the cumulative number of packets (100 packets, for example) as of a first known time. Transmission 110 is then carried out.

At 110, node S 12 places the first known quantity of packet into sent slot 32 of a first measuring packet 30 and transmits the first measuring packet to node D 14 via PVC 20. As noted above, node S 12 periodically carries out this step according to a predefined interval. Box 120 is then carried out.

At box 120, node D 14 receives the first measuring packet 30 transmitted by node S 12. In response, node D 12 determines the number of actual packets received from node S 12 from the counter 38. This value is the number of actual packets received (50 packets, for example) from node S 12 via PVC 20 when the first measuring packet is received ("first actual count of packets"). This value is normally a cumulative number of packets. Transmission 130 is then carried out.

At 130, node D 14 transmits a reply to the first measuring packet by placing the actual packets received value determined in box 120 in received slot 34 of measuring packet 30 and communicating the first measuring packet 30 back to node S 12. Box 140 is then carried out.

At box 140, node S 12 receives the transmission 130 from node D 14. The reply transmission 130 comprises first measuring packet 30 with slot 32 having the first known quantity of packets transmitted by S 12 to D 14 and with slot 34 having the first actual count of packets received by D 14 from S 12. Node S 12 stores the packet values into the packet data (42) memory storage as described above. Node S 12 then determines the number of packets that have been sent to node D 14 from the counter 38 (as described above in box 100). This value is the second known quantity of packets and is normally the cumulative number of packets (200 packets, for example) as of a second known time. Transmission 140 is then carried out.

At 140, node S 12 places the second known quantity of packet into sent slot 32 of a second measuring packet 30 and transmits the second measuring packet to node D 14 via PVC 20. Box 150 is then carried out.

At box 150, node D 14 receives the second measuring packet 30 transmitted by node S 12. In response, node D 12 determines the number of actual packets received from node S 12 from the counter 38, as described above. This value is the number of actual packets received (140 packets, for example) from node S 12 via PVC 20 when the second measuring packet is received ("second actual count of packets"). This value is normally a cumulative number of packets. Transmission 160 is then carried out.

At 160, node D 14 transmits a reply to the second measuring packet by placing the actual packets received value determined in box 150 in received slot 34 of measuring packet 30 and communicating the second measuring packet 30 back to node S 12. Box 170 is then carried out.

At box 170, node S 12 receives transmission 160 from node D 14. The reply transmission 160 comprises the second measuring packet 30 with slot 32 having the second known quantity of packets transmitted by S 12 to D 14 and with slot 34 having the second actual count of packets received by D 14 from S 12. Node S 12 stores the packet values from the second measuring packet into the packet data (42) memory storage as described above. In one preferred embodiment, the calculation module 44 in node S 12 calculates the packet loss for the data provided from the first and second measuring packets. As noted above, in operation, Node S 12 will receive a plurality of measuring packet replies from node D 14 over time, and thus packet loss may be calculated over time in a similar manner described herein for pairs of corresponding measuring packets. The details for calculating the packet loss are described more fully below in conjunction with FIG. 6.

Referring now to FIG. 6, as well as FIG. 1 through FIG. 5, there is shown a flow chart depicting the acts associated with calculating packet loss according to the present invention. The calculation is carried out by the calculation module 44 from data values in packet data 42, using values provided by a pair of measuring packets. More particularly, the calculation module 44 uses a first known quantity of packet transmitted from node S 12 to D 14 at a first known time (encapsulated in a first measuring packet), a first actual count of packets received by node D 14 from S 12 when node D 14 receives the first measuring packet, a second known quantity of packet transmitted from node S 12 to D 14 at a second known time (encapsulated in a second measuring packet), and a second actual count of packets received by node D 14 from S 12 when node D 14 receives the second measuring packet. It is noted that a deduction of packet loss may be carried out from a single measuring packet, rather than a pair of measuring packets, however, most service providers are interested in packet loss within certain time intervals (e.g., every 15 minutes), and thus the implementation described herein using a pair of packets is more suitable for use in that scenario.

At box 200, the calculation module 44 determines the difference between the number of packets transmitted at the first known time (first measuring packet) and the number of packets transmitted at the second known time (second measuring packet) to obtain a value of "packets sent". Using the example values from FIG. 5, 200 packets−100 packets=100 packets. Box 210 is then carried out.

At box 210, the calculation module 44 determines the difference between the first actual number of packets received by node D 14 when the first measuring packet is received and the second actual number of packets received by node D 14 when the second measuring packet is received to obtain a value for "packets received". Using the example values from FIG. 5, 140 packets−50 packets=90 packets. Box 220 is then carried out.

At box 220, the calculation module 44 determines the difference between the "packets sent" (calculated in box 200) and the "packets received" (calculated in box 210) to obtain the packet loss during the period between first known time and second known time. Using the example values from FIG. 5, 100 packets−90 packets=10 packets.

The above exemplary calculation scheme is only exemplary, and other calculation schemes using the pairs of measuring packets may be used without departing from the scope of the invention. The above sequence of calculation may be made for other pairs of measuring packets to obtain packet loss for corresponding time periods.

Accordingly, it will be seen that this invention provides a method and apparatus for accurately calculating packet loss between nodes along a communication channel. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for calculating packet loss for communication between a first and second node along a communication circuit connecting the nodes, said method comprising:
   a) transmitting, by the first node, a first known quantity of packets from the said node to the second node at a first known time;
   b) receiving, at said first node, a first actual count of packets received by said second node from said first known quantity of packets;
   c) transmitting, by said first node, a second known quantity of packets from said first node to said second node at a second known time;
   d) receiving, at said first node, a second actual count of packets received by said second node from said second known quantity of packets;
   e) determining the difference between said first known quantity of packets communicated at said first known time and said second known quantity of packets communicated at said second known time to obtain a value for packets sent;
   f) determining the difference between said first actual count of packets received and said second actual count of packets received to obtain a value for packets received; and
   g) determining the difference between said packets sent and said packets received to obtain a value for packet loss between said first known time and second known time.

2. The method of claim 1, wherein said first known quantity of packets, said first actual count of packets, said second known quantity of packets, and said second actual count of packets are communicated using a measuring packet having a sent packet slot and a received packet slot.

3. The method of claim 2, wherein said measuring packet is communicated inband.

4. The packet loss calculating apparatus of claim 1 wherein said measuring packet is communicated inband.

5. A method for calculating packet loss for communication between a first and second node along a communication circuit connecting the nodes, said method comprising:
   a) communicating a first measuring packet by the first node to the second node, said first measuring packet indicating the number of packets transmitted at a first known time;
   b) receiving said first measuring packet by said second node;
   c) communicating a first reply to said first measuring packet by said second node to said first node, said first reply indicating the number of packets received when said second node received said first measuring packet;
   d) receiving said first reply by said first node;
   e) communicating a second measuring packet by said first node to the second node, said second measuring packet indicating the number of packets transmitted at a second known time;
   f) receiving said second measuring packet by said second node;
   g) communicating a second reply to said second measuring packet by said second node to said first node, said second reply indicating the number of packets received when said second node received said second measuring packet;
   h) receiving said second reply by said first node;
   i) determining the difference between said number of packets transmitted at said first known time and said number of packets transmitted at said second known time to obtain a value for packets sent;
   j) determining the difference between said number of packets received when said second node received said first measuring packet and said number of packets received when said second node received said second measuring packet to obtain a value for packets received; and
   k) determining the difference between said packets sent and said packets received to obtain a value for packet loss between said first known time and second known time.

6. A program storage device readable by a machine, tangibly embodying a program of instructions executable by the machine to perform a method for calculating packet loss for communication between a first and second node along a communication circuit connecting the nodes, said method comprising:
   a) transmitting, by the first node, a first known quantity of packets from the said node to the second node at a first known time;
   b) receiving, at said first node, a first actual count of packets received by said second node from said first known quantity of packets;

c) transmitting, by said first node, a second known quantity of packets from said first node to said second node at a second known time;

d) receiving, at said first node, a second actual count of packets received by said second node from said second known quantity of packets;

e) determining the difference between said first known quantity of packets communicated at said first known time and said second known quantity of packets communicated at said second known time to obtain a value for packets sent;

f) determining the difference between said first actual count of packets received and said second actual count of packets received to obtain a value for packets received; and g) determining the difference between said packets sent and said packets received to obtain a value for packet loss between said first known rime and second known time.

7. The program storage device of claim 6, wherein said first known quantity of packets, said first actual count of packets, said second known quantity of packets, and said second actual count of packets are communicated using a measuring packet having a sent packet slot and a received packet slot.

8. The program storage device of claim 5, wherein said measuring packet is communicated inband.

* * * * *